United States Patent
Oteri et al.

(10) Patent No.: US 12,484,010 B2
(45) Date of Patent: Nov. 25, 2025

(54) CONFIGURATION AND CAPABILITY SIGNALING FOR ENHANCED POSITIONING TECHNIQUES IN CELLULAR SYSTEMS

(71) Applicant: Apple Inc., Cupertino, CA (US)

(72) Inventors: Oghenekome Oteri, San Diego, CA (US); Dawei Zhang, Saratoga, CA (US); Wei Zeng, San Diego, CA (US); Haitong Sun, Cupertino, CA (US); Hong He, Cupertino, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 18/456,928

(22) Filed: Aug. 28, 2023

(65) Prior Publication Data

US 2024/0284382 A1    Aug. 22, 2024

Related U.S. Application Data

(60) Provisional application No. 63/485,350, filed on Feb. 16, 2023.

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .............................. H04W 64/00; H04L 5/0051
See application file for complete search history.

(56) References Cited

U.S. PATENT DOCUMENTS

2022/0369270 A1\* 11/2022 Jiang ..................... H04L 5/0091
2023/0171797 A1\* 6/2023 Bao ..................... H04W 64/003
370/329

FOREIGN PATENT DOCUMENTS

WO    2022147805    7/2022

OTHER PUBLICATIONS

International Search Report and Written Opinion for PCT/US2024/011748; May 6, 2024.

(Continued)

*Primary Examiner* — Myron Wyche
(74) *Attorney, Agent, or Firm* — Kowert, Hood, Munyon, Rankin & Goetzel, P.C.

(57) ABSTRACT

Apparatuses, systems, and methods for enhanced positioning techniques using configuration and capability signaling in cellular systems. A method may include reporting, to a network node, an indication of one or more user equipment (UE) capability parameters associated with a processing procedure for positioning reference signal (PRS) bandwidth aggregation. The method may include receiving, from the network node and associated with the reported one or more UE capability parameters, a configuration for the processing procedure which supports multiple positioning frequency layer (multi-PFL) processing for aggregation of PRS resources across a plurality of PFLs and further supports one or more PFL groups comprising the plurality of PFLs to be configured on one or more component carriers (CCs). Additionally, respective PRS resources in respective PFL groups may share one or more common parameters and the method may further include performing, based on the received configuration, the processing procedure.

20 Claims, 10 Drawing Sheets

(56) References Cited

OTHER PUBLICATIONS

Cabrera-Mercader et al. "Study of PRS/SRS bandwidth aggregation—RRM aspects"; 3GPP TSG-RAN WG4 Meeting#105 R4-2218517; Nov. 14, 2022.

* cited by examiner

CONFIGURATION AND CAPABILITY SIGNALING FOR ENHANCED POSITIONING TECHNIQUES IN CELLULAR SYSTEMS

PRIORITY INFORMATION

This application claims priority to U.S. Provisional Patent Application Ser. No. 63/485,350, entitled "Configuration and Capability Signaling for Enhanced Positioning Techniques in Cellular Systems," filed Feb. 16, 2023, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for enhanced positioning techniques using configuration and capability signaling in cellular systems, e.g., in LTE systems, 5G NR systems, and beyond.

DESCRIPTION OF THE RELATED ART

Wireless communication systems are rapidly growing in usage. In recent years, wireless devices such as smart phones, wearable devices or accessory devices), and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for enhanced positioning techniques using configuration and capability signaling in cellular systems, e.g., in LTE systems, 5G NR systems, and beyond.

For example, in some embodiments, a method may include reporting, to a network node, an indication of one or more user equipment (UE) capability parameters associated with a processing procedure for positioning reference signal (PRS) bandwidth aggregation. The method may include receiving, from the network node and associated with the reported one or more UE capability parameters, a configuration for the processing procedure which supports multiple positioning frequency layer (multi-PFL) processing for aggregation of PRS resources across a plurality of PFLs and further supports one or more PFL groups comprising the plurality of PFLs to be configured on one or more component carriers (CCs). Additionally, respective PRS resources in respective PFL groups may share one or more common parameters and the method may further include performing, based on the received configuration, the processing procedure.

According to some embodiments, the configuration may configure the UE with one or more downlink-positioning reference signal-positioning frequency layer (DL-PRS-PFL) configurations. Additionally or alternatively, the one or more DL-PRS-PFL configurations may include one or more DL-PRS resource sets and the one or more DL-PRS resource sets include one or more DL-PRS resources. In some embodiments, the one or more common parameters may include at least one of a DL-PRS-SubcarrierSpacing parameter associated with a subcarrier spacing (SCS), a DL-PRS-CyclicPrefix parameter associated with a cyclic prefix, or DL-PRS-PointA parameter associated with an absolute frequency of a reference resource block.

In some embodiments, the indication may indicate support for one of a same PRS numerology in one or more contiguous component carriers or one or more different PRS numerologies in one or more contiguous component carriers. Additionally or alternatively, the indication may indicate support for UE-based positioning estimations using one of one or more contiguous PRS, one or more non-contiguous PRS, or one or more overlapping PRS. In some embodiments, the one or more common parameters may include at least one of a periodicity parameter, a repetition factor parameter, a resource time gap parameter, or a muting pattern parameter to indicate whether aggregation should be performed. In some embodiments, the configuration may support one PFL to configure one or more PRS resource sets on one or more component carriers (CCs).

According to further embodiments, the indication may indicate that the PRS resources of the one or more PRS resource sets are linked together according to one or more parameters to identify the PRS resources that are linked together, one or more parameters indicating all PRS resources are linked together, or the PRS resources may be linked together automatically. In some embodiments, the configuration may support mixed single carrier and multi-carrier positioning reference signal (PRS) aggregation. Additionally or alternatively, the configuration supporting mixed single carrier and multi-carrier PRS aggregation may be indicated by one or more separate numerology configurations received from the network node or implicitly through one or more parameters in the configuration received from the network node.

In some embodiments, an apparatus may include at least one processor configured to cause a user equipment (UE) to report, to a network node, an indication of one or more user equipment (UE) capability parameters associated with a processing procedure for positioning reference signal (PRS) bandwidth aggregation. The at least one processor may be further configured to cause the UE to receive, from the network node and associated with the reported one or more UE capability parameters, a configuration for the processing procedure. Additionally, the configuration may support multiple positioning frequency layer (multi-PFL) processing for aggregation of PRS resources across a plurality of PFLs and may further support one or more PFL groups to be configured on one or more component carriers (CCs). In some embodiments, the one or more PFL groups may include the plurality of PFLs used for aggregation of the PRS resources and respective PRS resources in respective PFL groups may share one or more common parameters. Additionally, the at least one processor may be further configured to cause the UE to perform, based on the received configuration, the processing procedure.

According to further embodiments, the one or more UE capability parameters may include one or more combinations of (N. T) values per one or more bands. N may be characterized as a duration of DL PRS symbols in milliseconds (ms) processed every T ms for a maximum bandwidth. Additionally or alternatively, the one or more bands may include up to three component carriers (CCs). In some embodiments, the one or more combinations of (N,T) values may be reported by the UE independently for the one to three CCs or for a maximum aggregated bandwidth.

In some embodiments, a network node may include one or more antennas, wireless transceiver circuitry communicatively coupled to the one or more antennas, and at least one processor operably coupled to the wireless transceiver circuitry and configured to cause the network node to receive, from a user equipment (UE), a report comprising an indication of one or more user equipment (UE) capability parameters associated with a processing procedure for positioning reference signal (PRS) bandwidth aggregation. The at least one processor may be further configured to cause the network node to transmit, to the UE, a configuration for the processing procedure. Additionally, the configuration may be associated with the reported one or more UE capability parameters and may support multiple positioning frequency layer (multi-PFL) processing for aggregation of PRS resources across a plurality of PFLs and further supports one or more PFL groups to be configured on one or more component carriers (CCs). Additionally, the one or more PFL groups may include the plurality of PFLs used for aggregation of the PRS resources and respective PRS resources in respective PFL groups may share one or more common parameters.

According to some embodiments, the one or more UE capability parameters may include a parameter indicating a number of DL PRS resources that the UE is capable of processing in a slot over an aggregated bandwidth. Additionally or alternatively, the parameter may be reported per subcarrier spacing (SCS) and per band. In some embodiments, if the configuration information supports a number of DL PRS resources greater than the number of DL PRS resources that the UE is capable of processing, the at least one processor may be further configured to cause the UE to determine that the number of DL PRS resources are arranged in decreasing order of measurement priority. Additionally or alternatively, the configuration information may associate a group of positioning frequency layers (PFLs) with one or more configuration parameters.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
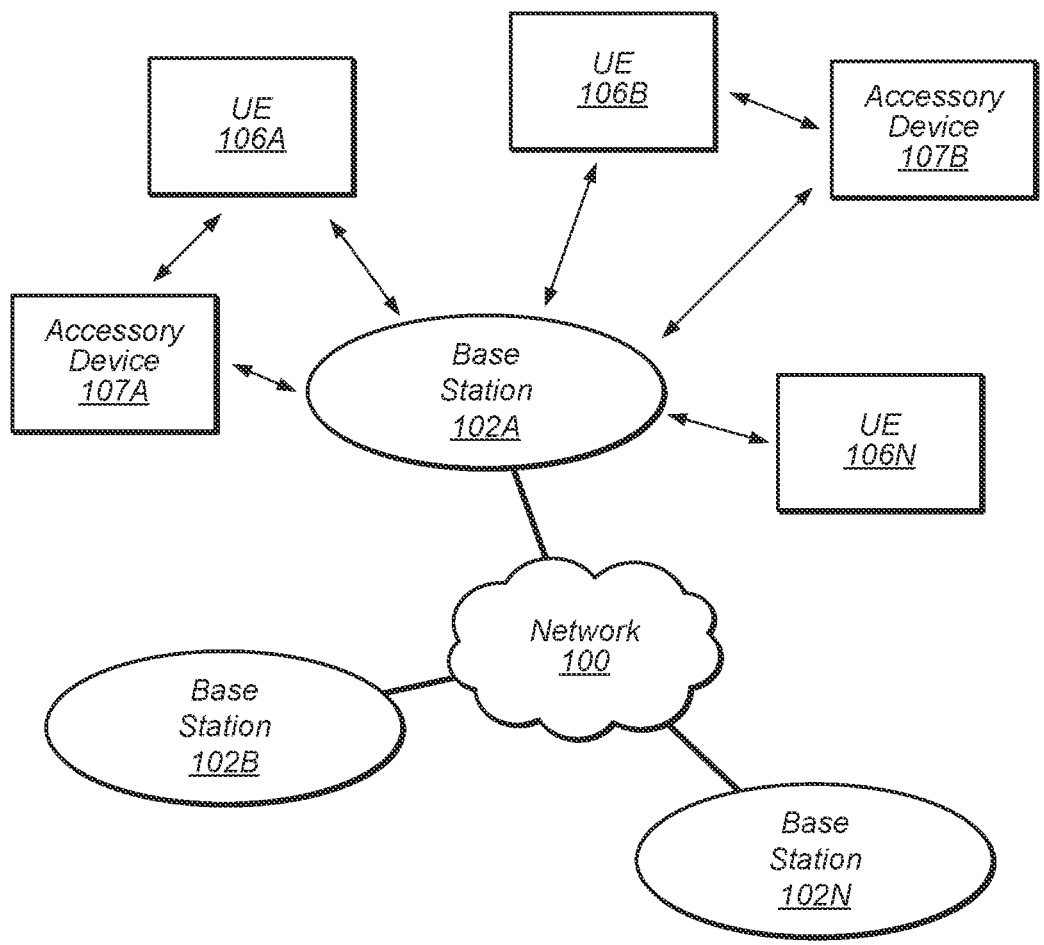
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
DL: Downlink
UL: Uplink
LTE: Long Term Evolution
NR: New Radio
5GS: 5G System
5GMM: 5GS Mobility Management
5GC/5GCN: 5G Core Network
gNB: Next Generation Node-B
IE: Information Element
CE: Control Element
RRM: Radio Resource Management
PRS: Positioning Reference Signal
SRS: Sounding Reference Signal
BW: Bandwidth
BWP: Bandwidth Part
RS: Reference Signal
IoT: Internet of Things
CC: Component Carrier
RSTD: Reference Signal Time Difference
RTOA: Relative Time of Arrival
PFL: Positioning Frequency Layer
SCS: Subcarrier Spacing
TRP: Transmission and Reception Point
TDOA: Time Difference of Arrival Terms The following is a glossary of terms used in this disclosure:

Memory Medium-Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium-a memory medium as described above, as well as a physical transmission medium, such as a bus, network, and/or other physical transmission medium that conveys signals such as electrical, electromagnetic, or digital signals.

Programmable Hardware Element-includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
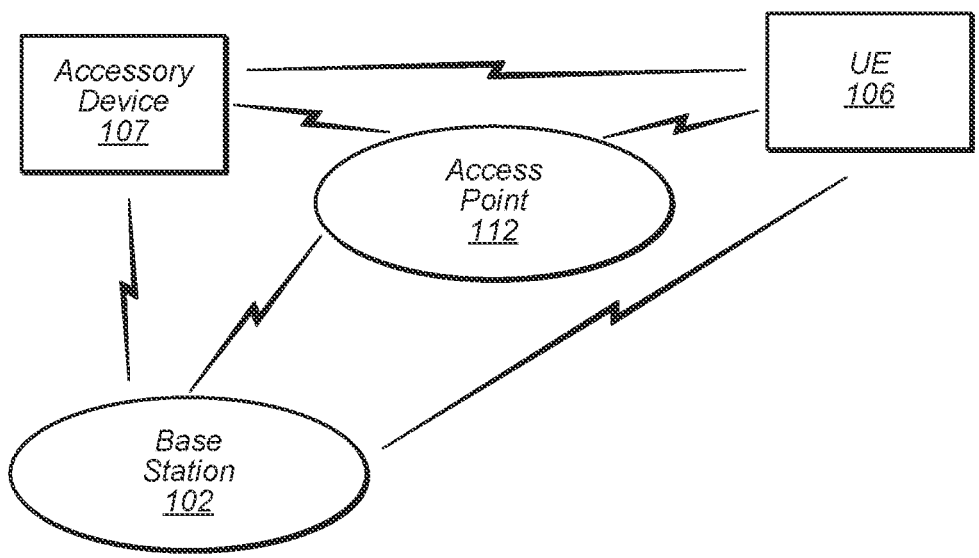
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more wireless devices, such as user devices 106A, 106B, etc., through 106N, as well as accessory devices, such as user devices 107A, 107B. Each of the user devices may be referred to herein as a "user equipment" (UE). Thus, the user devices 106 and 107 are referred to as UEs or UE devices.

The base station (BS) 102A may be a base transceiver station (BTS) or cell site (a "cellular base station") and may include hardware that enables wireless communication with the UEs 106A through 106N as well as UEs 107A and 107B.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106/107 may be capable of communicating using multiple wireless communication standards. For example, the UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, cHRPD), etc.). The UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Note that accessory devices 107A/B may include cellular communication capability and hence are able to directly communicate with cellular base station 102A via a cellular RAT. However, since the accessory devices 107A/B are possibly one or more of communication, output power, and/or battery limited, the accessory devices 107A/B may in some instances selectively utilize the UEs 106A/B as a proxy for communication purposes with the base station 102A and hence to the network 100. In other words, the accessory devices 107A/B may selectively use the cellular communication capabilities of its companion device (e.g., UEs 106A/B) to conduct cellular communications. The limitation on communication abilities of the accessory devices 107A/B may be permanent, e.g., due to limitations in output power or the RATs supported, or temporary, e.g., due to conditions such as current battery status, inability to access a network, or poor reception.

FIG. 1B illustrates user equipment 106 (e.g., one of the devices 106A through 106N) and accessory device (or user equipment) 107 (e.g., one of the devices 107A or 107B) in communication with a base station 102 and an access point 112 as well as one another, according to some embodiments. The UEs 106/107 may be devices with both cellular communication capability and non-cellular communication capability (e.g., Bluetooth, Wi-Fi, and so forth) such as a mobile phone, a wearable device, a hand-held device, a computer or a tablet, or virtually any type of wireless device. The accessory device 107 may be a wearable device such as a smart watch. The accessory device 107 may comprise cellular communication capability and be capable of directly communicating with the base station 102 as shown. Note that when the accessory device 107 is configured to directly communicate with the base station, the accessory device may be said to be in "autonomous mode." In addition, the accessory device 107 may also be capable of communicating with another device (e.g., UE 106), referred to as a proxy device, intermediate device, or companion device, using a short-range communications protocol; for example, the accessory device 107 may according to some embodiments be "paired" with the UE 106, which may include establishing a communication channel and/or a trusted communication relationship with the UE 106. Under some circumstances, the accessory device 107 may use the cellular functionality of this proxy device for communicating cellular voice and/or data with the base station 102. In other words, the accessory device 107 may provide voice and/or data packets intended for the base station 102 over the short-range link to the UE 106, and the UE 106 may use its cellular functionality to transmit (or relay) this voice and/or data to the base station on behalf of the accessory device 107. Similarly, the voice and/or data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of hand-held device, a media player, a computer, a laptop or virtually any type of wireless device. Note that when the accessory device 107 is configured to indirectly communicate with the base station 102 using the cellular functionality of an intermediate or proxy device, the accessory device may be said to be in "relay mode."

The UE 106/107 may include a processor that is configured to execute program instructions stored in memory. The UE 106/107 may perform any of the method embodiments described herein by executing such stored instructions. Alternatively, or in addition, the UE 106/107 may include a programmable hardware element such as an FPGA (field-programmable gate array) that is configured to perform any of the method embodiments described herein, or any portion of any of the method embodiments described herein.

The UE 106/107 may include one or more antennas for communicating using one or more wireless communication protocols or technologies. In some embodiments, the UE 106 may be configured to communicate using, for example, CDMA2000 (1×RTT/1×EV-DO/HRPD/cHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106/107 may share one or more parts of a receive and/or transmit chain between multiple wireless communication technologies, such as those discussed above.

In some embodiments, the UE 106/107 may include separate transmit and/or receive chains (e.g., including separate antennas and other radio components) for each wireless communication protocol with which it is configured to communicate. As a further possibility, the UE 106/107 may include one or more radios which are shared between multiple wireless communication protocols, and one or more radios which are used exclusively by a single wireless communication protocol. For example, the UE 106/107 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
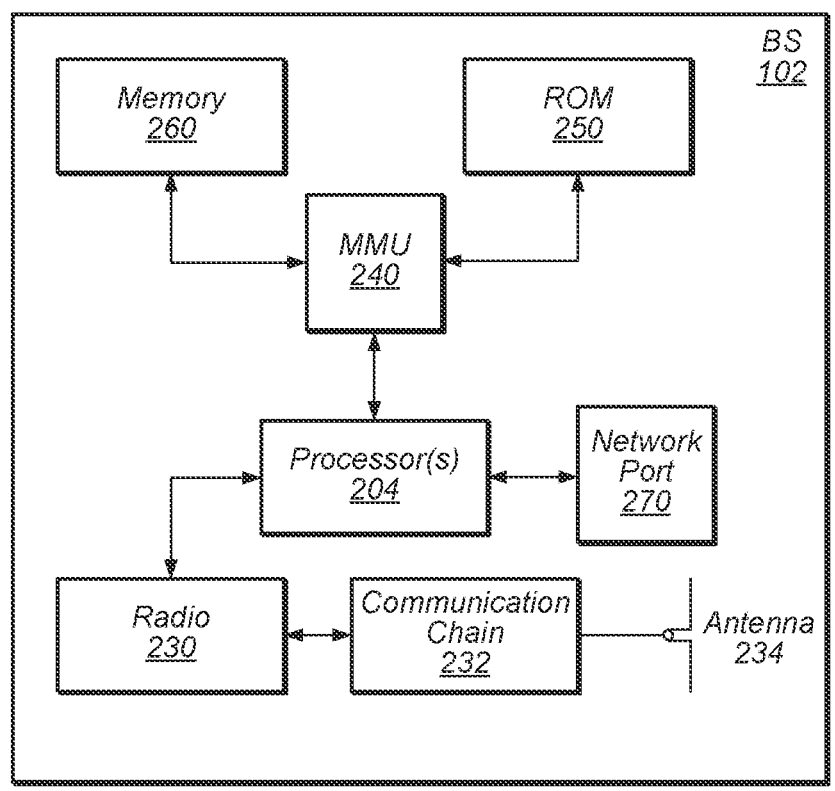
FIG. 2 illustrates an example block diagram of a base station, according to some embodiments.

FIG. 2: Block Diagram of a Base Station

Figure 3:
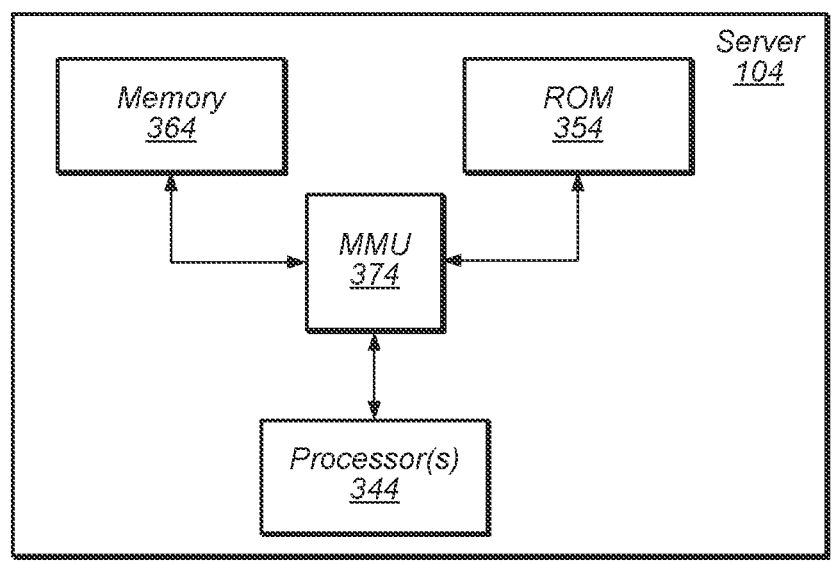
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR. LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (Ics) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (Ics) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (Ics) that are configured to perform the functions of processor(s) 344. In addition, each integrated circuit may include circuitry (e.g., first circuitry, second circuitry, etc.) configured to perform the functions of processor(s) 344.

Figure 4:
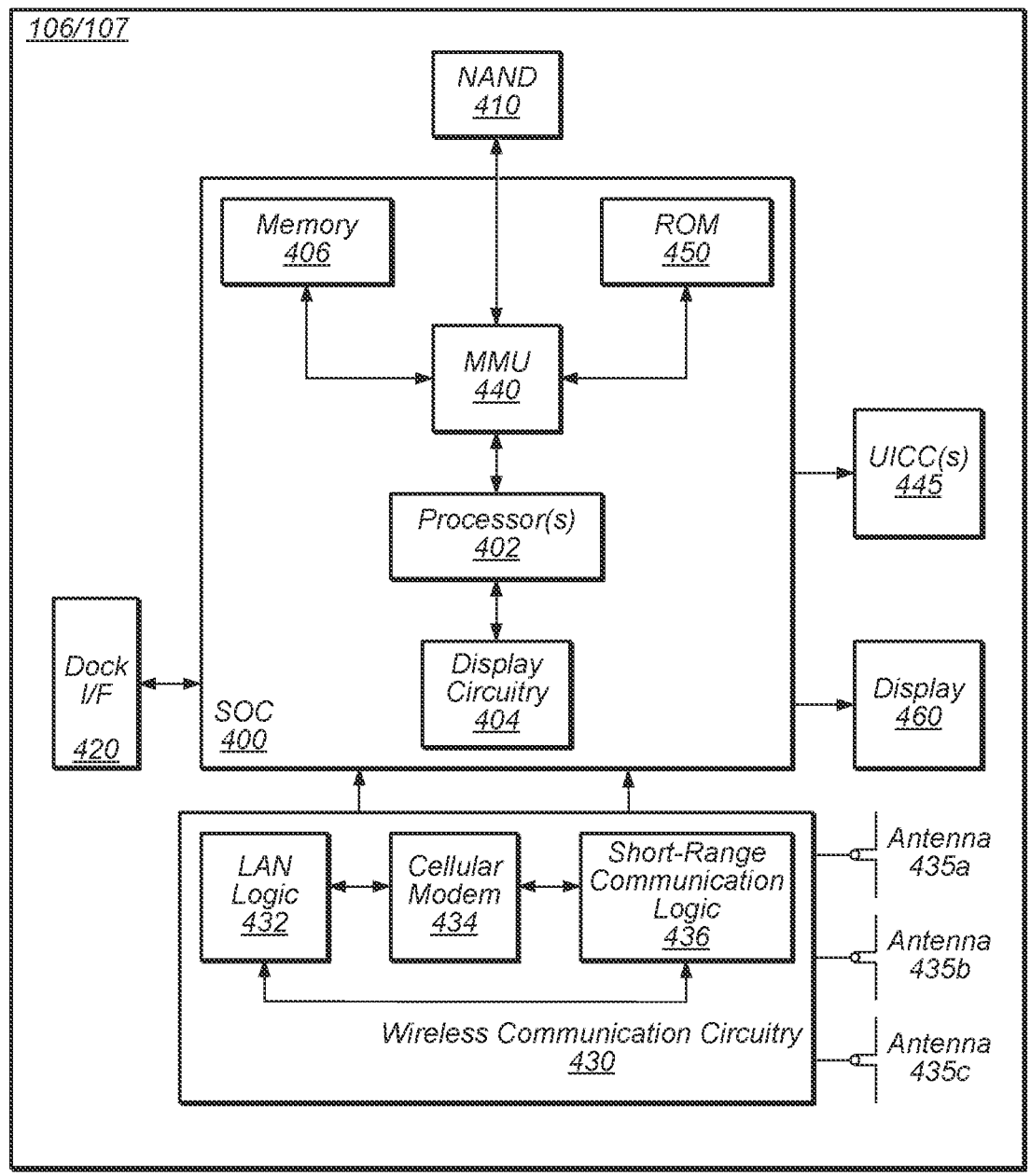
FIG. 4 illustrates an example block diagram of a UE according to some embodiments.

FIG. 4: Block Diagram of a UE

FIG. 4 illustrates an example simplified block diagram of a communication device 106/107, according to some embodiments. It is noted that the block diagram of the communication device of FIG. 4 is only one example of a possible communication device. According to embodiments, communication device 106/107 may be a user equipment (UE) device, a mobile device or mobile station, a wireless device or wireless station, a desktop computer or computing device, a mobile computing device (e.g., a laptop, notebook, or portable computing device), a wearable device, a tablet, an unmanned aerial vehicle (UAV), a UAV controller (UAC) and/or a combination of devices, among other devices. As shown, the communication device 106/107 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106/107 may include various types of memory (e.g., including NAND flash memory_410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106/107, and wireless communication circuitry 430. The wireless communication circuitry 430 may include a cellular modem 434 such as for 5G NR, LTE, GSM, etc., and short to medium range wireless communication logic 436 (e.g., Bluetooth™ and WLAN circuitry). In some embodiments, communication device 106/107 may include wired communication circuitry (not shown), such as a network interface card, e.g., for Ethernet.

The wireless communication circuitry 430 may couple (e.g., communicatively; directly or indirectly) to one or more antennas, such as antennas 435a, 435b, and 435c (e.g., 435a-c) as shown. The wireless communication circuitry 430 may include local area network (LAN) logic 432, the cellular modem 434, and/or short-range communication logic 436. The LAN logic 432 may be for enabling the UE device 106/107 to perform LAN communications, such as Wi-Fi communications on an 802.11 network, and/or other WLAN communications. The short-range communication logic 436 may be for enabling the UE device 106/107 to perform communications according to a short-range RAT, such as Bluetooth or UWB communications. In some scenarios, the cellular modem 434 may be a lower power cellular modem capable of performing cellular communication according to one or more cellular communication technologies.

In some embodiments, as further described below, cellular modem 434 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular modem 434 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106/107 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106/107 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106/107 may include at least two SIMs. Each SIM may execute one or more SIM applications and/or otherwise implement SIM functionality. Thus, each SIM may be a single smart card that may be embedded, e.g., may be soldered onto a circuit board in the UE 106/107, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106/107 may include a combination of removable smart cards and fixed/non-removable smart cards (such as one or more cUICC cards that implement eSIM functionality), as desired. For example, the UE 106/107 may comprise two embedded SIMs, two removable SIMs, or a combination of one embedded SIMs and one removable SIMs. Various other SIM configurations are also contemplated.

As noted above, in some embodiments, the UE 106/107 may include two or more SIMs. The inclusion of two or more SIMs in the UE 106/107 may allow the UE 106/107 to support two different telephone numbers and may allow the UE 106/107 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106/107 comprises two SIMs, the UE 106/107 may support Dual SIM Dual Active (DSDA) functionality. The DSDA functionality may allow the UE 106/107 to be simultaneously connected to two networks (and use two different RATs) at the same time, or to simultaneously maintain two connections supported by two different SIMs using the same or different RATs on the same or different networks. The DSDA functionality may also allow the UE 106/107 to simultaneously receive voice calls or data traffic on either phone number. In certain embodiments the voice call may be a packet switched communication. In other words, the voice call may be received using voice over LTE (VOLTE) technology and/or voice over NR (VONR) technology. In some embodiments, the UE 106/107 may support Dual SIM Dual Standby (DSDS) functionality. The DSDS functionality may allow either of the two SIMs in the UE 106/107 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for positioning reference signals (PRSs) for reduced capacity devices, e.g., in 5G NR systems and beyond, as further described herein.

As described herein, the communication device 106/107 may include hardware and software components for implementing the above features for a communication device 106/107 to communicate a scheduling profile for power savings to a network. The processor 402 of the communication device 106/107 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (Ics) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (Ics) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more Ics that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
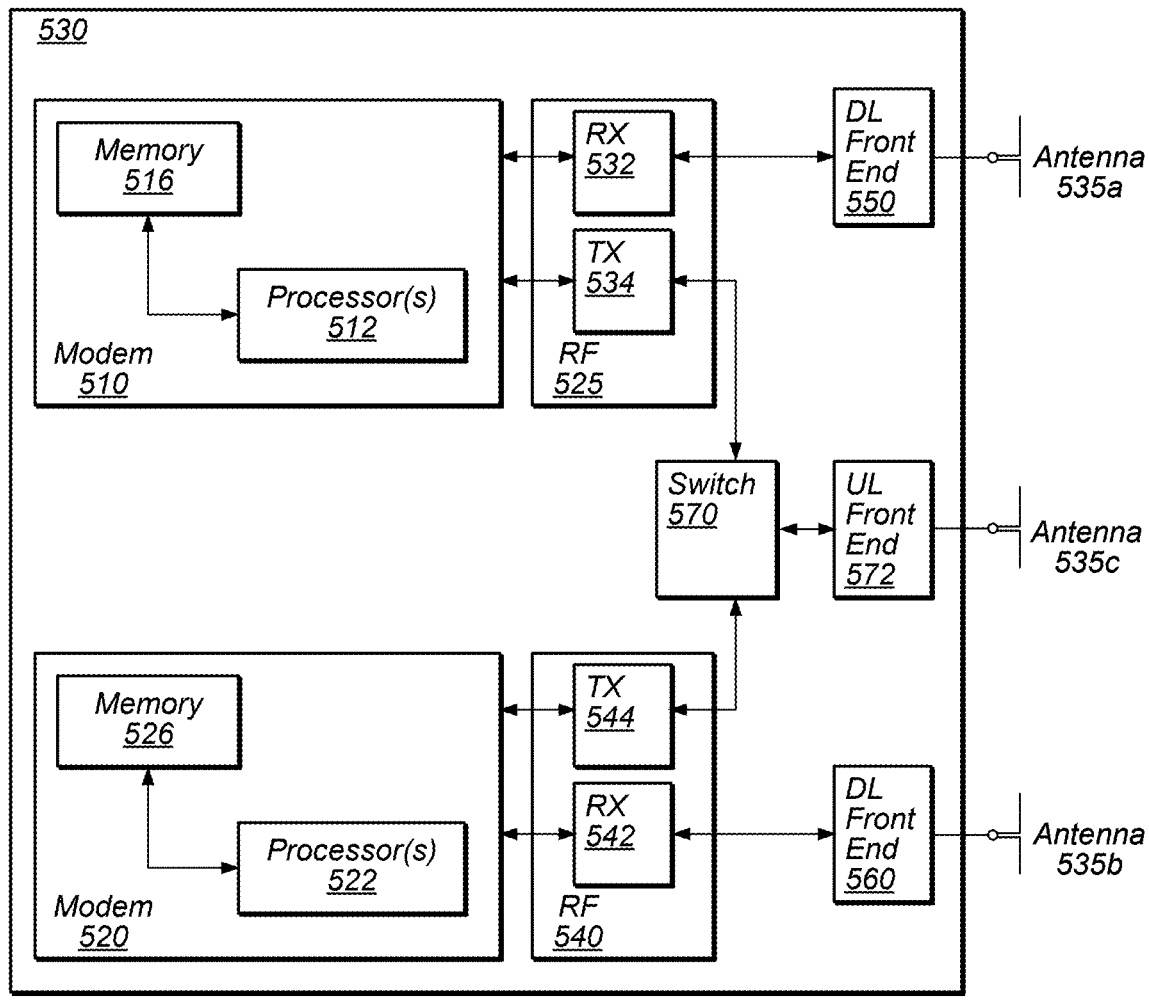
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular modem circuitry 434, may be included in a communication device, such as communication device 106/107 described above. As noted above, communication device 106/107 may be a user equipment (UE) device, a mobile device or mobile station, a wireless device or wireless station, a desktop computer or computing device, a mobile computing device (e.g., a laptop, notebook, or portable computing device), a tablet, a wearable device, and/or a combination of devices, among other devices.

The cellular communication circuitry 530 may couple (e.g., communicatively; directly or indirectly) to one or more antennas, such as antennas 535a-c (which may be antennas 435a-c of FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 525. RF front end 525 may include circuitry for transmitting and receiving radio signals. For example, RF front end 525 may include receive circuitry (RX) 532 and transmit circuitry (TX) 534. In some embodiments, receive circuitry 532 may be in communication with downlink (DL) front end 550, which may include circuitry for receiving radio signals via antenna 535a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 535b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 535c. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for positioning reference signals (PRSs) for reduced capacity devices, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 535a-c may be configured to implement part or all of the features described herein.

In addition, as described herein, processors 512 may include one or more processing elements. Thus, processors 512 may include one or more integrated circuits (Ics) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for positioning reference signals (PRSs) for reduced capacity devices, e.g., in 5G NR systems and beyond, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 535a-c may be configured to implement part or all of the features described herein.

In addition, as described herein, processors 522 may include one or more processing elements. Thus, processors 522 may include one or more integrated circuits (Ics) that are configured to perform the functions of processors 522. In addition, each integrated circuit may include circuitry (e.g., first circuitry, second circuitry, etc.) configured to perform the functions of processors 522.

Figure 6A:
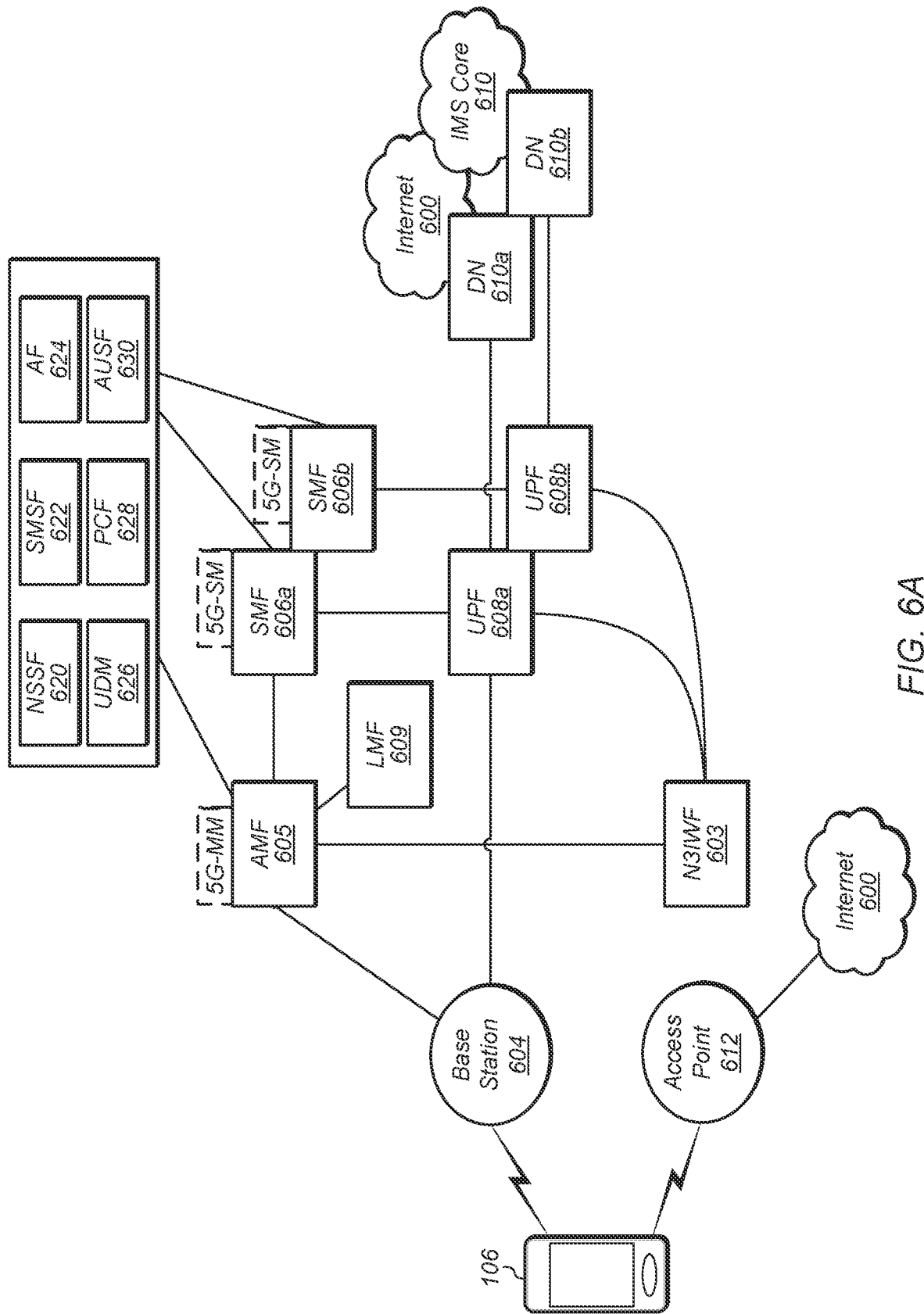
FIG. 6A illustrates an example of a 5G network architecture that incorporates both 3GPP (e.g., cellular) and non-3GPP (e.g., non-cellular) access to the 5G CN, according to some embodiments.
Figure 6B:
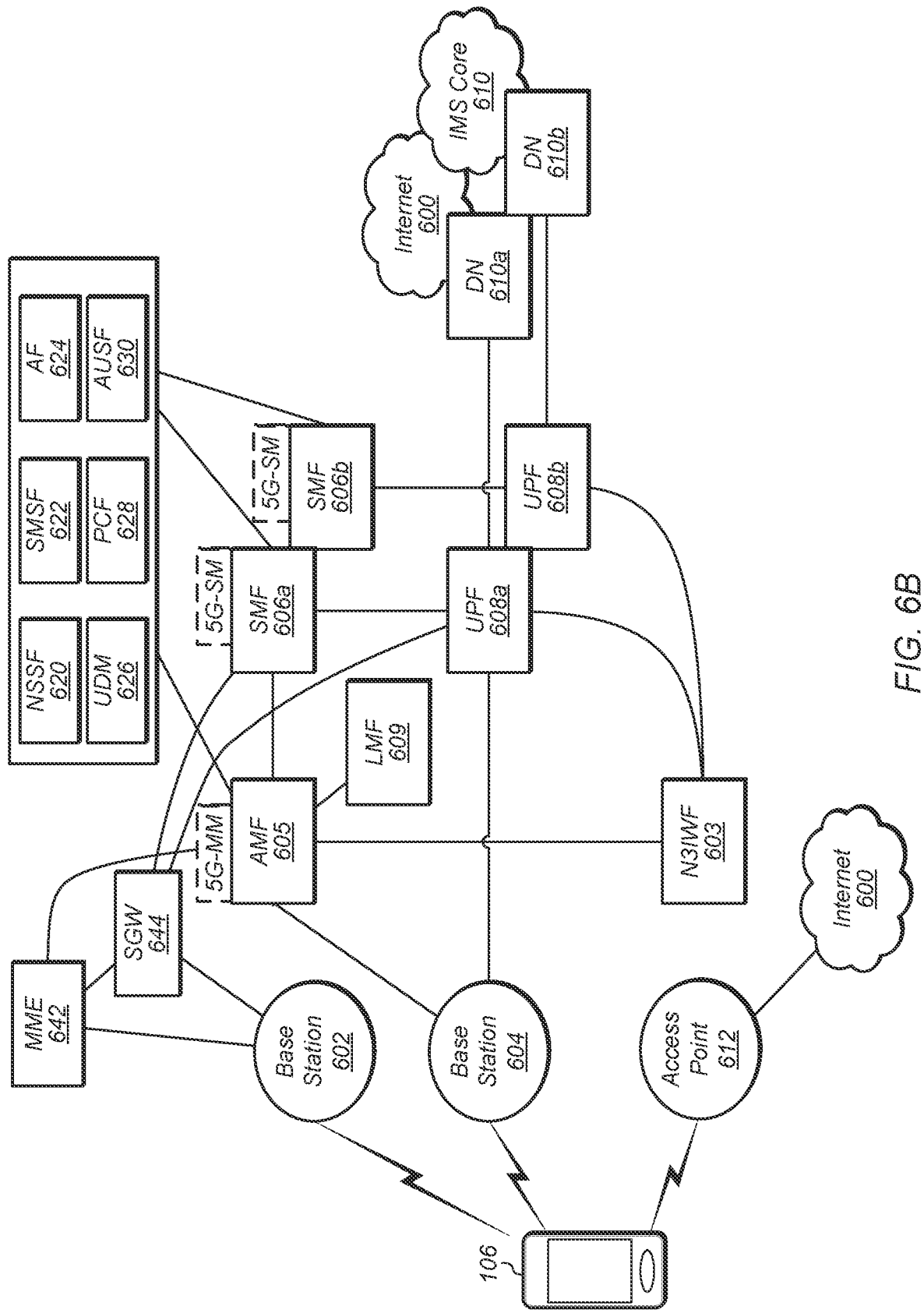
FIG. 6B illustrates an example of a 5G network architecture that incorporates both dual 3GPP (e.g., LTE and 5G NR) access and non-3GPP access to the 5G CN, according to some embodiments.
Figure 7:
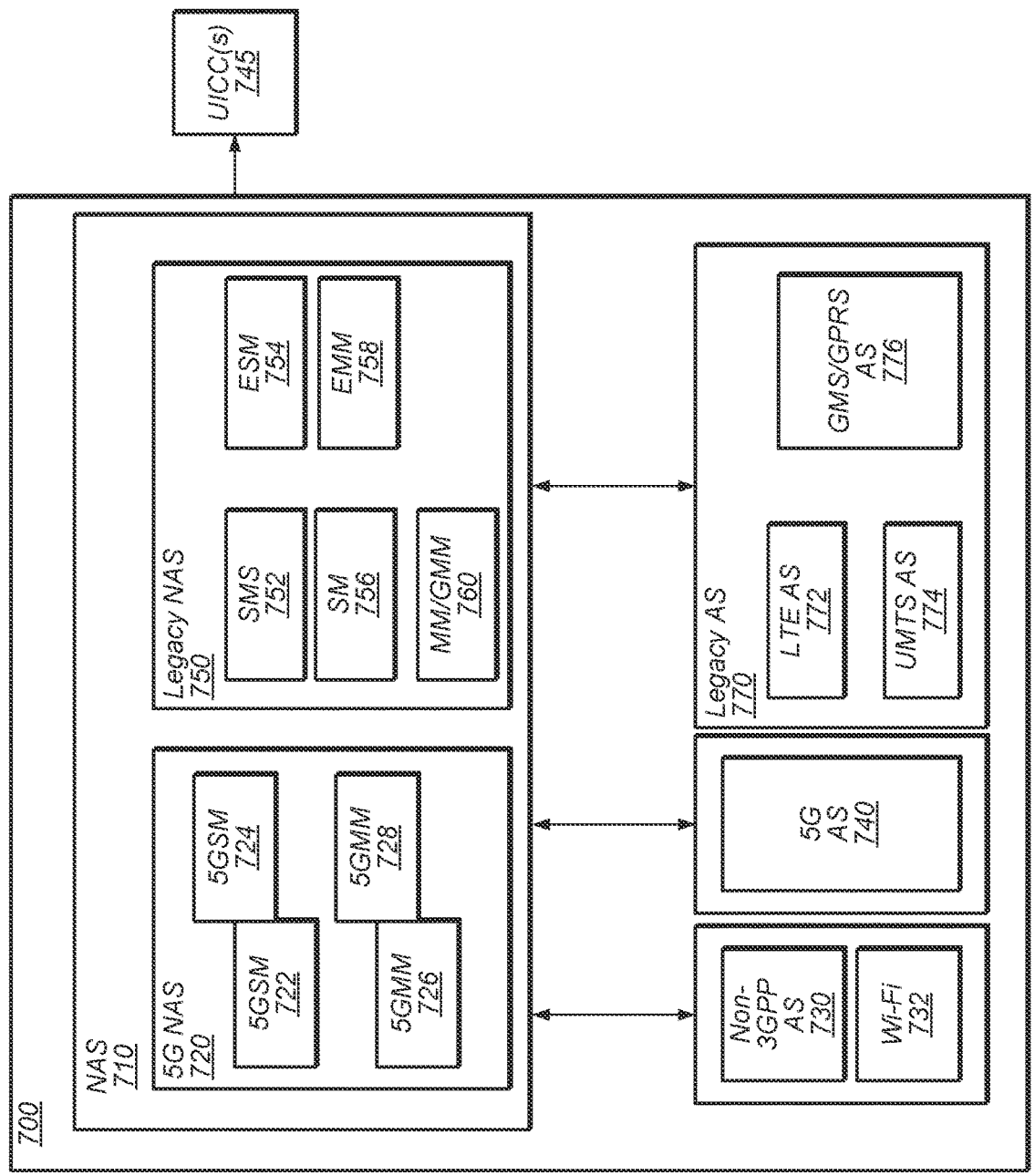
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may be in communication with an LMF 609 via a networking interface, such as an NLs interface, e.g., as described above, and may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods for positioning reference signals (PRSs) for reduced capacity devices, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for positioning reference signals (PRSs) for reduced capacity devices, e.g., in 5G NR systems and beyond, e.g., as further described herein.

Configuration and Capability Signaling for PRS Bandwidth Aggregation in Downlink Positioning Recent studies have discussed solutions necessary to support high accuracy (horizontal and vertical), low latency, network efficiency (scalability and reference signal (RS) overhead, as some examples), and device efficiency (power consumption and complexity, as some examples) requirements for enhanced downlink positioning procedures. Furthermore, the studies have sought to identify and evaluate positioning techniques, DL/UL positioning reference signals, signaling and procedures for improved accuracy, reduced latency, network efficiency, and device efficiency.

More specifically, studies relating to aggregating multiple DL positioning frequency layers of the same or different bands to improve positioning performance for both intra-band and inter-band scenarios. Additionally, the impact of channel spacing, timing offset, phase offset, frequency error, and power imbalance among component carriers (CCs) to the positioning performance for intra-band contiguous and/or non-contiguous and inter-band scenarios have been evaluated alongside UE complexity considerations.

Some conclusions included that aggregation of New Radio (NR) positioning frequency layers may improve positioning accuracy under certain scenarios, configurations, and assumptions on modelled impairments such as bandwidth and spacing of aggregated layers, timing offset and frequency offset over frequency layers, phase discontinuity and possible amplitude imbalance, according to some embodiments. Additionally, aggregation of DL PRS resources involving simultaneous transmission by next-generation node-B (gNB) and reception by the UE of intra-band carriers (one or more contiguous carriers) in one or more contiguous positioning frequency layers (PFLs) may also be related scenarios for which positioning accuracy could be improved. In other words, various scenarios and their applicability and feasibility from both the gNB and UE perspectives involving configurations, bands and radio frequency (RF) architectures may offer further positioning accuracy related enhancements, according to some embodiments. Similarly and according to some embodiments, aggregation of sounding reference signals (SRS) for positioning resources in the aforementioned scenarios may also offer further positioning accuracy related enhancements.

Furthermore, bandwidth aggregation may be implemented based on a single PFL with multiple PRS resources or multiple PFLs with single or multiple PFL resources, according to some embodiments. Accordingly, it may be beneficial for a UE to be able to indicate support for either type based on its capability. Additionally, it may be further beneficial for the UE to be able to indicate if it requires contiguous PRS resources for bandwidth aggregation in the case of UE-based positioning, according to some embodiments.

Accordingly, it may be beneficial to further specify bandwidth aggregation for positioning measurements across one to three intra-band contiguous carriers. Furthermore, specifying signaling and procedures to support aggregation of PRS/SRS (respectively) resources across PFLs/carriers (respectively) for positioning measurements under the assumption that the signals over aggregated resources are transmitted and received (respectively) using a single RF chain (same antenna) may be further beneficial. According to some embodiments, the support of bandwidth aggregation for positioning measurements may only apply timing related measurements (e.g., reference signal time difference (RSTD), relative time of arrival (RTOA), and UE/gNB Rx-Tx time difference). Therefore, it may be beneficial to specify radio resource management (RRM) requirements with measurement gaps in the connected inactive modes including PRS measurement period and/or reporting.

In some embodiments, a DL-PRS-Positioning Frequency Layer (PFL, e.g., DL-PRS-PositioningFrequencyLayer) may include a collection of one or more DL-PRS resource sets (e.g., DL-PRS-ResourceSets). Furthermore, a DL-PRS resource set may include one or more DL-PRS resources. Additionally, the bandwidth (BW) of PRS may be considered to include up to 272 resources. Although this may be greater than the bandwidth part (BWP) bandwidth, typically the UE uses enough bandwidth resources (that it is capable of using) so as to achieve a desired positioning accuracy, according to some embodiments.

According to some embodiments, a PFL may be defined per band and there may not be specific to a UE. Additionally or alternatively, multiple PFLs may be defined in the same band, according to some embodiments. Accordingly and in this case, PRS resources from different PFLs may collide in time and frequency.

Furthermore, DL PRS resources and DL PRS resource sets in the same DL-PRS-PositioningFrequencyLayer may have common parameters configured by a DL-PRS-PositioningFrequencyLayer configuration. For example, DL PRS resources and DL PRS resource sets in the same DL-PRS-PositioningFrequencyLayer may share parameters such as DL-PRS-SubcarrierSpacing (e.g., subcarrier spacing (SCS)), DL-PRS-CyclicPrefix (e.g., cyclic prefix), and/or DL-PRS-PointA which may correspond to the absolute frequency of the reference resource block (e.g., its lowest subcarrier may be Point A), according to some embodiments.

According to some embodiments, while UE DL PRS processing capability may be currently supported for a single positioning frequency layer, it may be beneficial to enable or provide a UE capability for simultaneous DL PRS processing across multiple positioning frequency layers (which may not have been previously supported in past 3GPP releases (e.g., Release 16)). Moreover, regarding a scenario in which the UE supports multiple positioning frequency layers, the UE may still be expected to process one frequency layer (e.g., a PFL) at a time, according to some embodiments. Accordingly, if the UE is not expected to process more than one PFL at a time, there may exist a need to update existing PFL definitions, configurations as well as corresponding UE capabilities to allow for multi-PFL processing for bandwidth aggregation, according to some embodiments.

Figure 8:
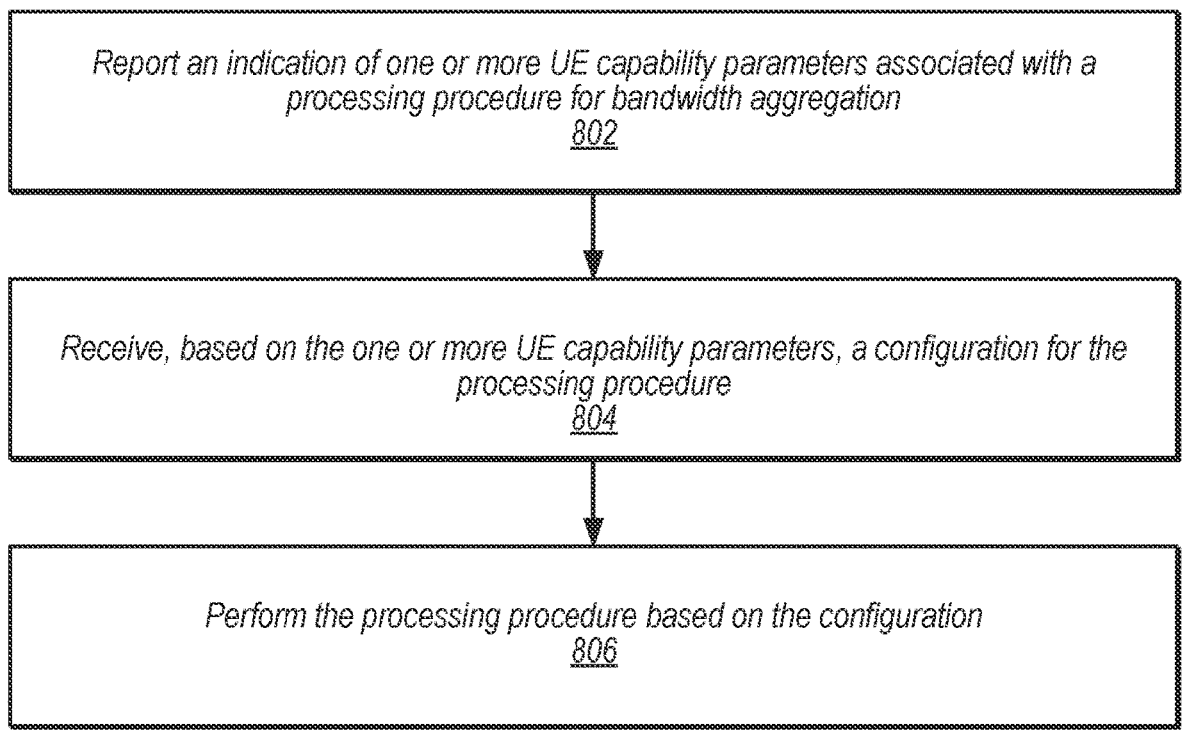
FIG. 8 illustrates a block diagram of an example method for enhanced positioning techniques using configuration and capability signaling, according to some embodiments.

FIG. 8—Configuration and Capability Signaling for Multi-PFL DL PRS Processing FIG. 8 illustrates a block diagram of an example of a method for enhanced positioning techniques using configuration and capability signaling. More specifically, FIG. 8 illustrates how utilization of multi-PFL configurations and UE indicated capabilities may allow for multi-PFL processing for bandwidth aggregation. In some embodiments, these enhancements may be used to address the problem in which the UE does not expect to process more than one PFL at a time. Aspects of the method of FIG. 8 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. In some embodiments, the UE may communicate directly with a base station, and the base station may in turn communicate with an access mobility function (AMF) of a 5GC that services the PLMN associated with the TN. In some embodiments, the UE may also communicate with a Location Management Function {LMF} for location configuration and estimation. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 802, a UE may report, to a network node, an indication of one or more UE capability parameters associated with a processing procedure for bandwidth aggregation, according to some embodiments. For example, depending on the hardware and software of the UE, it may be beneficial for the UE to indicate its capabilities pertaining to aggregation of PRS resources to the network. In some embodiments, the UE may indicate it is capable of using a single PFL for bandwidth aggregation of PRS resources where the PFLs are defined by band. In other words, the UE may indicate that it is capable of processing one PFL at a time, according to some embodiments. Additionally or alternatively, the UE may indicate that it is able to aggregate different PRS resources wherein the resources reside within a single PFL, according to some embodiments.

According to further embodiments, the UE may provide an indication of its capability regarding support of multiple PFLs within a single band for aggregation of PRS resources. For example, with regard to numerology (e.g., subcarrier spacing(s) (SCS) as one example of numerology such as SCS 15, 30, 60, 120, 240, 480, 960 kHz), the UE may indicate support for a same PRS numerology in each contiguous component carrier (CC). Additionally or alternatively, the UE may indicate support for different PRS numerologies in contiguous carriers. In some embodiments, the UE may indicate support for a specific subset of the numerology parameters. In other words, the UE may notify or provide an indication regarding respective subcarrier spacing(s) it is capable of supporting (e.g., communicating via) with regard to respective contiguous carriers.

In some embodiments, the UE may indicate its support regarding contiguous and/or non-contiguous PRS resources. For example, the UE may indicate that it supports bandwidth aggregation for contiguous PRSs in UE-based positioning estimations, according to some embodiments. Additionally or alternatively, the UE may notify the network or indicate that it supports bandwidth aggregation for non-contiguous PRS resources in UE-based positioning estimations. Furthermore, the UE may indicate support for bandwidth aggregation using overlapping PRS resources (e.g., overlapping in frequency). This to allow for phase continuity estimation in UE-based positioning estimation, according to some embodiments. Accordingly, these options may provide improvement to the performance of non-simultaneous transmission of PRS for bandwidth aggregation in positioning estimations, according to some embodiments. Additionally or alternatively, for LMF-based positioning estimation, it may be beneficial for the UE to indicate support for simultaneous or sequential measurement of the PRS resources in the PFL(s), according to some embodiments.

In 804, the UE may receive, from the network node and based on the reported one or more UE capability parameters, a configuration for the processing procedure, according to some embodiments. Additionally, the configuration may support multiple positioning frequency layer (multi-PFL) processing by the UE. For example, if the UE provided an indication that it is capable of supporting multiple PFLs within a single band for aggregation of PRS resources across PFLs, the network may provide corresponding configuration information for the UE to perform said processing procedures related to bandwidth aggregation.

In some embodiments, the configuration may, based on the UE's indicated capabilities (e.g., capability parameters), include configuration(s) for a single PFL configuration across all CCs, according to some embodiments. Additionally or alternatively, the configuration may, based on the UE's indicated capabilities, include configuration(s) for separate PFL configuration per CC. More specifically, the configuration may include information related to numerology and/or time and frequency allocation. For example, as one option, the network may provide the UE with configurations or configuration information for a same numerology, time domain parameters (e.g., periodicity and/or repetition factor as some examples), and frequency distribution (e.g., combSize N) parameters. Additionally or alternatively, the network may provide configurations for different frequency domain resource parameters (e.g., DL-PRS-pointA and/or Resourcebandwidth, as some examples). According to some embodiments, the network may provide the UE with configurations of different numerologies, time domain parameters, and/or frequency domain parameters.

In some embodiments, the configuration may, based on the UE's indicated capabilities, include configuration(s) regarding sequence construction of the PRS resources. For example, the configuration may include information corresponding to separate identifiers (e.g., PRS-IDs) for each CC. More specifically, the configuration may include updated parameters such as SRSPosResourceSet to allow for SRSPosResources in different CCs. Additionally or alternatively, the configuration may include information corresponding to a single sequence to be used for all CCs. Furthermore, there may be a limit of the sequence based on a maximum length allowed in 3GPP specifications, according to some embodiments. However, according to some embodiments, it may be possible to extend the sequence size by increasing the comb size.

According to further embodiments, the configuration may include information corresponding to same or different PFL numerology configurations. For example, the configuration may include a same numerology configuration for a PFL Configuration having the same parameters such as DL-PRS-SubcarrierSpacing, DL-PRS-CyclicPrefix, according to some embodiments. Additionally or alternatively, the configuration may include a PRS Resource Set Configuration having the same parameters such as DL-PRS-Periodicity, DL-PRS-ResourceRepetitionFactor. DL-PRS-ResourceTimeGap, DL-PRS-ResourceSetSlotOffset, and DL-PRS-MutingPattern, as some examples. Furthermore, the configuration may include a PRS Resource Configuration having the same parameters such as DL-PRS-ResourceSlotOffset, dl-PRS-ResourceSymbolOffset-r16, and/or DL-PRS-NumSymbols. Furthermore, regarding the scenario of different numerology configurations, the configuration may include modifications to any of the aforementioned parameters (e.g., Periodicity and MutingPattern as some examples).

According to some embodiments, the configuration may include various same or different numerology parameters. For example, regarding the PFL parameters, the DL-PRS-SubcarrierSpacing and DL-PRS-CyclicPrefix parameters may be the same in the configuration while the DL-PRS-PointA may be different in the configuration, according to some embodiments.

In some embodiments corresponding to the Positioning Resource Set parameters, the DL-PRS-Periodicity (e.g., {4, 5, 8, 10, 16, 20, 32, 40, 64, 80, 160, 320, 640, 1280, 2560, 5120, 10240} slots), DL-PRS-ResourceRepetitionFactor (e.g., how many times each DL-PRS resource is repeated for a single instance), DL-PRS-ResourceTimeGap (e.g., slot in which the offset in number of slots between two repeated instances of a DL PRS resource with the same DL-PRS-ResourceID, the time duration spanned by one instance of a DL-PRS may not be expected to exceed a configured value of DL-PRS-Periodicity), DL-PRS-ResourceSetSlotOffset (e.g., the slot offset with respect to SFN0 slot 0), and DL-PRS-MutingPattern (e.g., a bitmap of the time locations where the DL PRS resource is expected to not be transmitted for a DL PRS resource set) parameters may be the same in the configuration.

Alternatively and regarding the Positioning Resource Set parameters, the DL-PRS-ResourceSetId, DL-PRS-CombSizeN, DL-PRS-ResourceBandwidth (e.g., number of resource blocks configured for PRS transmission—the parameter may have a granularity of 4 physical resource blocks (PRBs) with a minimum of 24 PRBs and a maximum of 272 PRBs), and the DL-PRS-StartPRB (e.g., a starting PRB index of the DL PRS resource with respect to reference Point A—the starting PRB index may have a granularity of one PRB with a minimum value of 0 and a maximum value of 2176 PRBs) parameters may be different in the configuration, according to some embodiments.

According to further embodiments and regarding the Positioning Resource parameters, the DL-PRS-ResourceID (e.g., all DL PRS resource IDs locally defined within a DL PRS resource set), DL-PRS-SequenceID (e.g., to initialize "cinit" value used in pseudo random generator in which a PRS sequence is generated in each orthogonal frequency division multiplexed (OFDM) symbol within the slot in which the PRS is sent), DL-PRS-ReOffset (e.g., may define the starting RE offset of the first PRS symbol), and DL-PRS-QCL-Info (e.g., quasi-colocation (QCL) information of the DL PRS resource with other reference signals) parameters may be different in the configuration.

Alternatively and regarding the Positioning Resource parameters, the DL-PRS-ResourceSlotOffset (e.g., starting slot of the DL PRS resource with respect to corresponding DL-PRS-ResourceSetSlotOffset), dl-PRS-ResourceSymbolOffset-r16 (e.g., symbol offset within a PRS slot), and DL-PRS-NumSymbols (e.g., number of symbols of the DL PRS resource within a slot may be one of {2,2}, {4,2}, {6,2}, {12,2}, {4,4}, {12,4}, {6,6}, {12,6}, and {12,12}) parameters may be the same in the configuration, according to some embodiments.

In some embodiments, the configuration may include information corresponding to the grouping of PFLs. For example, the configuration may configure a new PFL Group to serve as a container (holder) for the set of PFL groups to be configured on the separate CCs. In other words, the PFL group may contain the PFLs for each separate CC. More specifically, the configuration (e.g., PFL Group Configuration) may include a new configuration parameter such as PFL_group which includes a group of PFLs used in PRS aggregation. In other words, a PFL group may characterized as PFL_group={PFL1, PFL2, . . . , PFLn}, according to some embodiments. Accordingly, the PFLs in the PFL group may be characterized as PFLs: PFLi={PRS1, . . . , PRSn}, the PRS Resource Set may be characterized by PRSi= {PR1, . . . , PRn}, and the PRS Resources may be characterized by PRi, according to some embodiments. In some embodiments, the PFL_group may serve the same function as the PFL in legacy 3GPP releases (e.g., Rel-16, Rel-17, and prior releases) such that a PFL_group containing a single PFL functions as the PFL for previous releases.

According to some scenarios, the configuration may include information corresponding to a single PFL. For example, the configuration information may be used to define a single PFL such that PRS resource Sets are configured for separate CCs. More specifically, the configuration may enable a common DL-PRS-PointA or 1 DL-PRS-PointA per CC, according to some embodiments. Additionally and as a first option, the configuration may be used to create a Positioning-Resource-set-Aggregation flag to identify PRS resources that are linked together. Alternatively, as a second option, the configuration may be used to create a flag to indicate that all PRS resources in a PFL are linked together. As a third option, the configuration may be used to indicate that all PRS resources in the PFL are linked together automatically, according to some embodiments.

In 806, the UE may perform the processing procedure based on the configuration, according to some embodiments. For example, having received a configuration in 804 supporting multiple positioning frequency layer (multi-PFL) processing by the UE, the UE may proceed to perform said processing procedures for bandwidth aggregation in positioning estimation procedures. More specifically, the UE may perform reference signal measurements and/or processing of at least one PRS and according to the configuration provided by the network. For example, if the configuration received by the network configured a PFL_group to include a group of PFLs to be used in PRS aggregation, the UE may perform processing of the appropriate resources in the resource sets of the PFLs making up the PFL group, according to some embodiments.

Figure 9A:
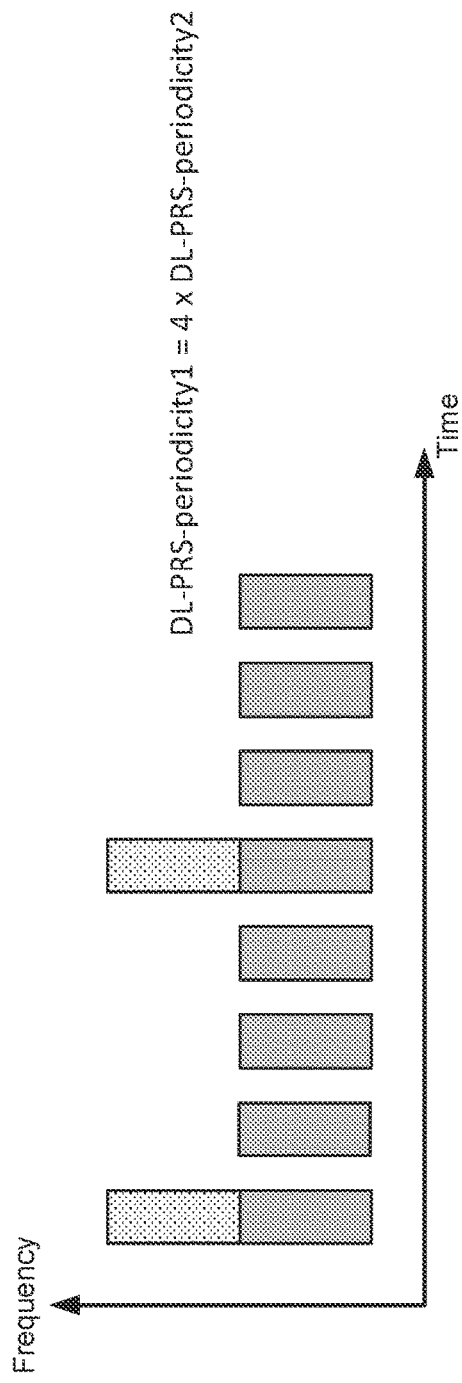
FIGS. 9A and 9B illustrate example aspects of mixed aggregation enhanced positioning techniques, according to some embodiments.
Figure 9B:
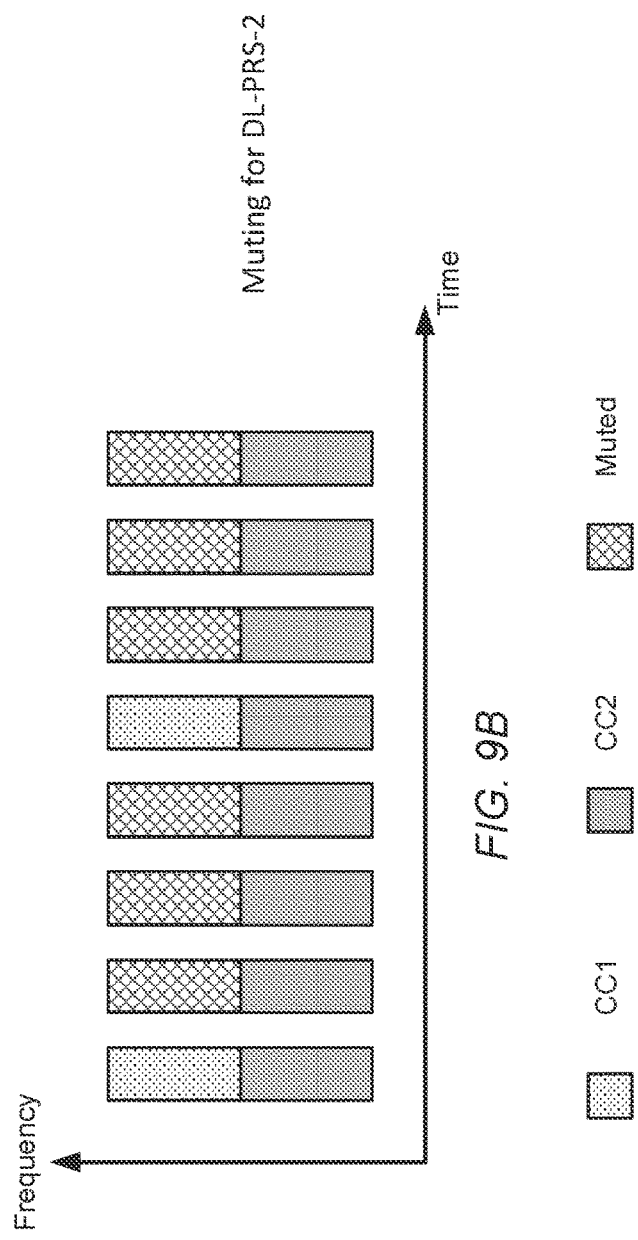

FIGS. 9A-9B—Mixed Aggregation Positioning Configuration

FIGS. 9A and 9B illustrate example aspects of mixed aggregation enhanced positioning techniques, according to some embodiments. For example, it may be possible for the UE to employ a mixed configuration utilizing high accuracy BW aggregation positioning and lower accuracy single CC positioning techniques. More specifically, the UE may use the same configuration for both single and multi-carrier PRS aggregation, according to some embodiments. For example, as a first option, the UE may receive configuration signaling from the network which may explicitly indicate separate numerology configurations for each case. For example, the configuration may indicate a specific SCS configuration for both a single CC as well as for BW aggregation positioning procedures involving multiple CCs.

According to some embodiments, the UE may receive a configuration or configuration information from the network which may implicitly indicate whether BW aggregation will be used. For example, the network may use configuration parameters such as periodicity, repetition factor, resource time gap, and muting pattern to indicate whether aggregation should be performed or not performed. Additionally or alternatively, the configuration provided by the network may indicate that aggregation is used only when there is an overlap of resources, according to some embodiments.

FIGS. 9A and 9B illustrate example aspects of how a configuration for mixed aggregation positioning may be utilized. For example, FIG. 9A describes a scenario in which time and frequency resources (PRS) of a first component carrier (CC1) and a second component carrier (CC2) can be aggregated as part of a mixed BW aggregation procedure. Additionally, while FIGS. 9A and 9B illustrate PRS resources associated with different component carriers CC1 and CC2, some mixed aggregation procedures may not be limited to this scenario. For example, according to some embodiments, the PRS resources for mixed aggregation may be associated with a single component carrier (e.g., CC1=CC2, according to one scenario). Additionally, while not shown in FIGS. 9A and 9B, there may be additional PRS resources associated with a third component carrier (e.g., CC3), according to some embodiments.

FIG. 9A illustrates a possible scenario in which CC1 has been configured (e.g., a UE has received a configuration from the network with implicitly defined parameters) with a first periodicity (e.g., DL-PRS-periodicity1) which corresponds to or is equivalent to four times a configured second periodicity of CC2 (e.g., 4×DL-PRS-periodicity2). In other words, the PRS of CC1 may only be aggregated with every fourth PRS of CC2, according to some embodiments.

FIG. 9B describes an example scenario in which a muting pattern of time and frequency resources (PRS) of a first component carrier (CC1) and a second component carrier (CC2) can be aggregated as part of a mixed BW aggregation procedure. For example, FIG. 9B illustrates a possible scenario in which CC1 has been configured (e.g., a UE has received a configuration from the network) with implicitly defined parameters such as a muting pattern corresponding to PRS resources of CC1. More specifically, the muting pattern of FIG. 9B may correspond to an indication from the network (e.g., as part of the configuration) that aggregation should be performed at every fourth PRS resource of CC1. In other words, the three PRS resources of CC1 between every fourth PRS resource may be muted and therefore not used for aggregation, according to some embodiments.

Figure 10:
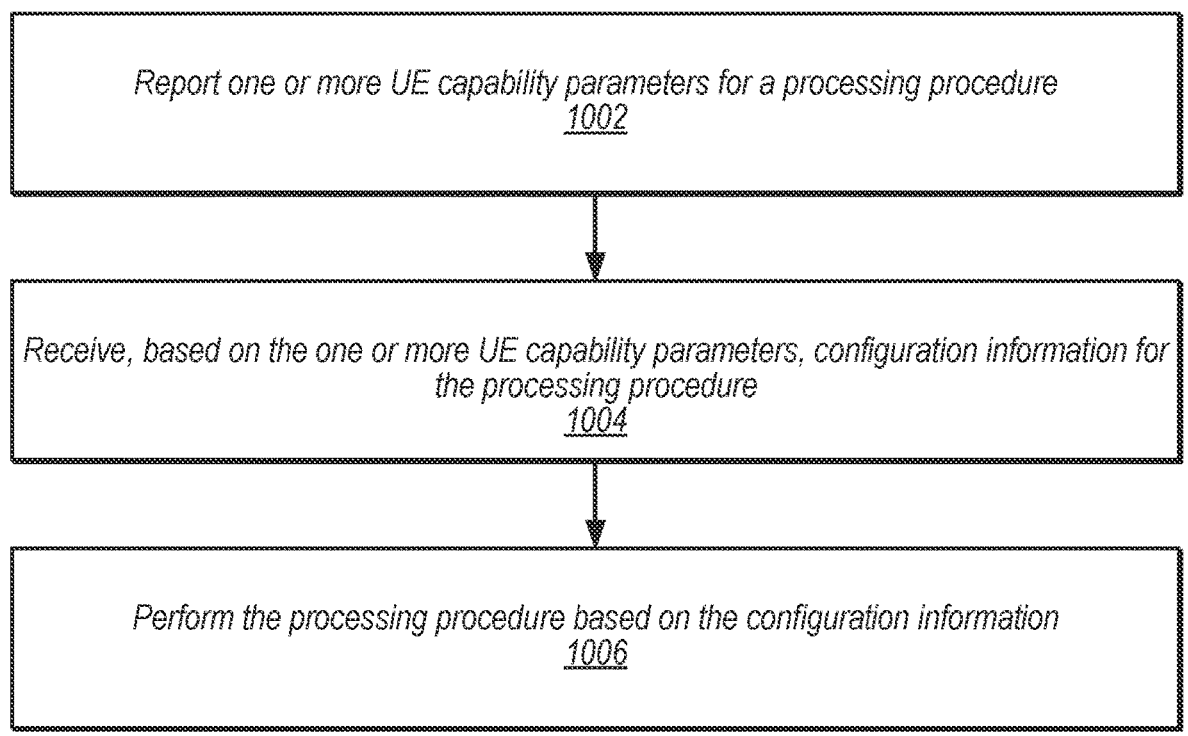
FIG. 10 illustrates a block diagram of an example method for configuration and capability signaling related to downlink positioning reference signal processing, according to some embodiments.

FIG. 10—Processing Capability Configurations for Downlink PRS Positioning Estimations FIG. 10 is a block diagram of an example of a method for configuration and capability signaling related to downlink positioning reference signal processing. More specifically, FIG. 10 illustrates example aspects of a method of utilizing processing capability configurations for downlink positioning estimations. For example, in order to ensure that the UE is not configured to perform processing beyond its capability, it may be beneficial for the UE to inform the network of its maximum processing capability.

In some embodiments related to a UE DL PRS processing capability, the UE may report (e.g., provide a capability report to the network) a combination of (N. T) values per band. More specifically, N may be a duration of DL PRS symbols in ms processed every T ms for a given maximum bandwidth (B) in MHz supported by UE. Furthermore, the band may correspond or contain up to three component carriers (CCs). Accordingly, the UE may report the following sets of values for N. T and B as being supported:

Values for N={0.125, 0.25, 0.5, 1, 2, 4, 8, 12, 16, 20, 25, 30, 35, 40, 45, 50} ms
Values for T={8, 16, 20, 30, 40, 80, 160, 320, 640, 1280} ms
Values for maximum DL PRS BW in MHz, reported by UE:
For FR1: {5, 10, 20, 40, 50, 80, 100} MHZ
For FR2: {50, 100, 200, 400} MHZ In some embodiments, the reporting of (N. T) values for a maximum BW in MHz may not be dependent on subcarrier spacing (SCS). Accordingly, it may be beneficial to describe how the UE may report its processing capabilities for BW aggregation scenarios. More specifically. UE DL PRS processing capabilities may be defined for multiple positioning frequency layers that are processed together. In other words, UE capabilities concerning simultaneous DL PRS processing across multiple positioning frequency layers may allow for increased efficiency through BW aggregation across CCs.

Aspects of the method of FIG. 10 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. In some embodiments, the UE may communicate directly with a base station, and the base station may in turn communicate with an access mobility function (AMF) of a 5GC that services the PLMN associated with the TN. Additionally, the UE may communicate with an LMF. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1002, the UE may report, to a network node, one or more UE capability parameters associated with a processing procedure. For example, the UE may report a combination of (N, T) values for a given maximum bandwidth (B) in MHz as being supported by UE. According to some embodiments, a UE may report (N, T) values for each CC independently using a legacy method. For example, a UE may include, as part of the report, an additional BW aggregation factor (Time), where T_total=Sum(Ti)+[Ni]*BW_aggregation_factor, and Ti=T for each CC and Ni=# of CCs. Accordingly, for the purpose of DL PRS processing capability, the counting PRS duration within a P msec window may be estimated per CC (e.g., as in legacy scenarios).

According to further embodiments, the UE may report (N. T) values for a maximum aggregated BW which may not be dependent on SCS. For example, as a first option, the UE may report values for T such as {8, 16, 20, 30, 40, 80, 160, 320, 640, 1280}, 2*{8, 16, 20, 30, 40, 80, 160, 320, 640, 1280}, 3*{8, 16, 20, 30, 40, 80, 160, 320, 640, 1280} ms. Alternatively, as a second option, the UE may report values for T which are multiplied by Ni+[Ni]*BW_aggregation_factor. Additionally or alternatively, the UE may report values for maximum DL PRS BW in MHz such as {5, 10, 20, 40, 50, 80, 100}. 2*{5, 10, 20, 40, 50, 80, 100}. 3*{5, 10, 20, 40, 50, 80, 100} MHz for frequency range 1 (FR1) and {50, 100, 200, 400}. 2*{50, 100, 200, 400}, 3*{50, 100, 200, 400} MHz for FR2.

Accordingly, for the purpose of DL PRS processing capability, the counting duration within a P msec window may be estimated over all CCs in the aggregated BW. For example, as first option, the window may be estimated with reference to a reference CC. Alternatively, as a second option, the window may be estimated as union individual time of all CCs. As a third option, there may not be a change in UE DL processing capability and therefore the number of samples to be measured may be the same regardless of whether PFL aggregation is performed or not performed, according to some embodiments. Accordingly, the processing time may be characterized by ½x{T}, or ⅓{T} (e.g., assuming that the BW is increased by 2 or 3, as two examples).

According to further embodiments, the UE may include a new parameter as part of the report. For example, the UE may include a number of DL PRS resources that UE can process in a slot over the aggregated bandwidth, which may reported per SCS per band, according to some embodiments. For example, the UE may report values for FR1 bands selected from: {1, 2, 4, [6], 8, 12, 16, [24], 32, [48], 64}, 2*{1, 2, 4, [6], 8, 12, 16, [24], 32, [48], 64}, 3*{1, 2, 4, [6], 8, 12, 16, [24], 32, [48], 64} for each SCS: 15 kHz, 30 kHz, 60 kHz. Additionally or alternatively, the UE may report values for FR2 bands that are selected from: {1, 2, 4, [6], 8, 12, 16, [24], 32, [48], 64}, 2*{1, 2, 4, [6], 8, 12, 16, [24], 32, [48], 64}, 3*{1, 2, 4, [6], 8, 12, 16, [24], 32, [48], 64} for each SCS: 60 kHz, 120 KHz. Accordingly, there may be a need to define time over multiple CCs if they are not aligned. For example, if the CCs are not aligned in time, the report may utilize a reference CC to define a start point at X symbols before a start time and an end point X symbols after an end time. Additionally or alternatively. X may be defined as a function of the subcarrier spacing, according to some embodiments. In other words, X may be adjusted for different PFLs based on varying SCS associated with said PFLs, according to some embodiments.

In 1004, the UE may receive, from the network node and based on one or more capability parameters, configuration information for the processing procedure, according to some embodiments. Additionally, the configuration information may provide support for a downlink (DL) positioning reference signal (PRS) processing procedure. For example, having reported its processing capabilities and appropriate values/parameters to the network, the UE may receive, a configuration or configuration information corresponding to a processing procedure, according to some embodiments. For example, the configuration may support a multi-PFL processing procedure by the UE and therefore the UE may use the corresponding configuration information to perform said multi-PFL processing procedures related to bandwidth aggregation, according to some embodiments.

According to some embodiments, when a UE is configured with a number of PRS resources beyond its capability, the UE may assume that the DL-PRS resources are sorted in a decreasing order of measurement priority. For example, the UE may assume a priority structure in which a maximum of four frequency layers (e.g., PFLs) are supported. In other words, the maximum number of positioning frequency layers the UE supports may be indicated by values {1, 2, 3, 4}. Additionally, a PFL may support a maximum of 64 transmission and reception points (TRPs). Accordingly, there may be a maximum number of 256 TRPs corresponding to the four PFLs. Furthermore, a TRP may support a maximum of two PRS resource sets and a resource set may support a maximum of 64 resources. In some embodiments, the maximum number of DL PRS Resource Sets per TRP per frequency layer supported by UE may be indicated by the values={1, 2}.

In some embodiments, the four frequency layers, the 64 TRPs per frequency layer, the two resource sets per TRP of the frequency layer, and the 64 resources of the set per TRP per frequency layer may all be sorted according to priority, according to some embodiments. Furthermore, the reference PRS indicated by nr-DL-PRS-ReferenceInfo-r16 for each frequency layer may have the highest priority at least for DL-TDOA signaling. However, in the case of aggregation, there may be a different maximum number of resources and measurement priorities to consider.

Accordingly, in order to address potential maximum parameter values, it may be beneficial to update the processing capability of the UE to incorporate PFL groups. For example, as a first option, configuration signaling maybe used to explicitly associate a group of PFLs with its parameters. More specifically, a single parameter set may be used to indicate which configuration to use, according to some embodiments. Alternatively and as a second option, the signaling may be similar to that of legacy releases (e.g., Rel-16/Rel-17) in which independent parameter sets may be signaled per CC. For example, in some embodiments, explicit signaling may be used to indicate that parameters should be jointly measured and/or processed. Additionally or alternatively, the UE may be able to implicitly identify parameter sets that should be jointly measured and/or processed, according to some embodiments. Furthermore, the UE may not expect the network (e.g., gNB) to configure or signal active configuration that violates its processing capability (e.g., contiguous or non-contiguous capability), according to some embodiments.

Furthermore, the UE may not expect measurement priority on different CCs to result in a non-viable resource configuration. In other words, the UE may assume or expect that the configuration received from the network will be within or supported by its processing capabilities. For example, the UE may not expect to be configured with a number of PRS beyond its capability, according to some embodiments.

According to some embodiments, the configuration signaling received from the network may be the same as Rel-16/17. In other words, a single parameter set may be signaled across all CCs, according to some embodiments. Additionally or alternatively, a single sequence may be defined for all resources across all the CCs, according to some embodiments.

Accordingly, it may be beneficial to define new parameter containers based on PFL groups and update the maximum number of associated resources, resource sets, and TRPs. For example, one or more processing capabilities may be indicated by parameter containers of PRS frequency layer groups (e.g., a group of PFLs) used for a single BW aggregation measurement, according to some embodiments. More specifically, the PRS frequency layer group may contains up to N PFLs where Ni=1, . . . , 3 for a maximum of four PFL groups. In some embodiments, the maximum number of positioning frequency layers groups the UE supports may be indicated by values {1, 2, 3, 4}. Additionally, the PFL groups may be associated with a maximum number of TRPs of 64. Furthermore, a resource set group may be characterized as a group of resource sets associated with a PFL group and each PFL in a PFL group may be further associated with a resource set (e.g., as in Rel-16/

Rel-17). Accordingly, each PFL Group may be associated with a corresponding resource set group, according to some embodiments.

Furthermore, the new parameter containers of PFL groups may support a maximum number of two PRS resource set groups per TRP, according to some embodiments. Accordingly, the maximum number of resource sets within a TRP may be characterized by 2*Ni where resource sets are grouped as Ni resource sets per resource group (e.g., a group of resources associated with a Resource Set Group). In some embodiments, the maximum number of DL PRS Resource Sets Groups per TRP per frequency layer groups supported by UE may be indicated by the values={1, 2}. Furthermore, there may be a maximum number of 64 resources per PRS resource set group. Accordingly, the maximum number of resources per resource set group would be characterized by 64*Ni and the maximum number of TRPs for all PFL/PFL groups would be 256, according to some embodiments.

In some embodiments, when a UE is configured with a number of PRS resources beyond its capability, the UE may assume that the DL-PRS Resource Groups are sorted in a decreasing order of measurement priority. For example, the UE may assume a priority structure in which a maximum of four frequency layer groups (e.g., groups of PFLs) are supported. Accordingly, a maximum number of positioning frequency layers groups that the UE may support across all positioning methods and across all bands may be indicated via the values {1, 2, 3, 4}. Additionally, a PFL group may support a maximum of 64 transmission and reception points (TRPs). Accordingly, there may be a maximum number of 256 TRPs corresponding to all of the frequency layers (e.g., all PFLs in the PFL groups). In some embodiments, the maximum number of TRPs across all positioning frequency layer groups per UE may be indicated by values such as {4, 6, 12, 16, 24, 32, 64, 128, 256}. Furthermore, a TRP may support a maximum of two PRS resource sets and a resource set may support a maximum of 64 resources, according to some embodiments.

In some embodiments, when a UE is configured with a number of PRS resources beyond its capability the UE may assume the DL-PRS Resource Groups are sorted in a decreasing order of measurement priority. For example, the four frequency layer groups, the 64 TRPs per frequency layer group, the two resource sets per TRP of the frequency layer group, and the 64 resources of the set per TRP per frequency layer group may all be sorted according to priority, according to some embodiments. Furthermore, the reference PRS indicated by nr-DL-PRS-ReferenceInfo-r18 for each frequency layer group may have the highest priority at least for DL-TDOA signaling.

In 1006, the UE may perform the processing procedure based on the configuration information. For example, having received configuration information in 1004 supporting a processing procedure by the UE according to its reported processing capabilities, the UE may proceed to perform said processing procedures for bandwidth aggregation in positioning estimation procedures. More specifically, the UE may perform reference signal measurements and/or processing of at least one PRS and according to the configuration provided by the network in response to the UE's reported processing capability. For example, if the UE reported that it was capable of processing a maximum of 128 DL PRS resources, the configuration information received by the network may include a configuration to support or configure a processing procedure corresponding to said maximum number of DL PRS resources (e.g., 128, as one example), according to some embodiments.

Additional Information

According to some embodiments related to PRS bandwidth aggregation, a common or same numerology may be necessary across all intra-band contiguous PFLs to be aggregated. Additionally or alternatively, PRS resources to be aggregated from different PFLs may have different bandwidths (e.g., a different number of PRS RBs). Furthermore, PRS resources to be aggregated from different PFLs may be transmitted in the same slot and in the same symbols, according to some embodiments. Additionally or alternatively, PRS resources to be aggregated from different PFLs may be transmitted by the same TRP and associated with a common Antenna Reference Point (ARP).

According to some embodiments related to SRS bandwidth aggregation, a common or same numerology may be required across all intra-band contiguous carriers to be aggregated. Additionally or alternatively, SRS resources to be aggregated from different carriers may have different bandwidths (e.g., a different number of SRS RBs). Furthermore, SRS resources to be aggregated from different carriers may be transmitted in the same slot and in the same symbols, according to some embodiments.

In some embodiments related to both PRS and SRS bandwidth aggregation, fast Fourier transform/inverse fast Fourier transform (FFT/IFFT) size(s) may be decided based on UE implementation. Accordingly, it may be beneficial for PRS/SRS bandwidth aggregation to allow for UE implementation flexibility with regard to single FFT/IFFT or multiple FFTs/IFFTs (e.g., FFT/IFFT per carrier) implementations. Additionally or alternatively, PRS/SRS bandwidth aggregation may be supported in RRC_CONNECTED and RRC_INACTIVE modes depending on one or more UE capabilities, according to some embodiments.

According to further embodiments, a PFL group container may be created so as to link the configurations of the PFLs used in the PRS aggregation. For example, a PFL group container may be associated with the following structure:

$$PFL\_group = \{PFL1, PFL2, ..., PFLn\}$$

$$PFLs: PFLi = \{PFS1, ..., PRSn\}$$

$$PRS \text{ Resource Set: } PRSi = \{PR1, ..., PRn\}$$

$$\text{Positioning Resource: } PRi$$

In some embodiments related to previous releases such as Rel-16, UE DL PRS processing capability may be defined for a single positioning frequency layer and a UE capability for simultaneous DL PRS processing across positioning frequency layers may not be supported. However, support for multiple PFL processing may be possible via adjusted values of N and T in which N is a duration of DL PRS symbols in ms processed every T ms for a given maximum bandwidth (B) in MHz supported by the UE, according to some embodiments.

In some embodiments, the UE may report a new parameter corresponding to a number of DL PRS resources that UE can process in a slot over the aggregated bandwidth. Additionally or alternatively, this new parameter may be reported per SCS per band.

According to further embodiments, when a UE is configured with a number of PRS resources beyond its capability, the UE may assume or determine that the DL-PRS Resources are sorted in a decreasing order of measurement priority. Furthermore, the associated maximum numbers and associated priorities may be updated for PRS aggregation, according to some embodiments. Additionally or alternatively, when the PFLs are on different cells with different SSB timings, PRS processing prioritization with SSB transmission may be utilized as part of the enhanced processing methods described herein.

Example Embodiments

In some embodiments, a method may include reporting, to a network node, an indication of one or more UE capability parameters associated with a processing procedure for bandwidth aggregation. Additionally the method may include receiving, from the network node and based on the reported one or more UE capability parameters, a configuration for the processing procedure. Furthermore, the configuration may support multiple positioning frequency layer (multi-PFL) processing by a user equipment (UE). The method may further include performing, based on the received configuration, the processing procedure.

According to some embodiments, the configuration may configure the UE with one or more downlink-positioning reference signal-positioning frequency layer (DL-PRS-PFL) configurations. Additionally or alternatively, the one or more DL-PRS-PFL configurations may include one or more DL-PRS resource sets and the one or more DL-PRS resource sets include one or more DL-PRS resources. In some embodiments, the configuration may support multi-PFL for aggregation of positioning reference signal (PRS) resources across a plurality of PFLs.

In some embodiments, the indication may indicate support for one of a same PRS numerology in one or more contiguous component carriers or one or more different PRS numerologies in one or more contiguous component carriers. Additionally or alternatively, the indication may indicate support for UE-based positioning estimations using one of one or more contiguous PRS, one or more non-contiguous PRS, or one or more overlapping PRS. In some embodiments, the configuration may support one or more PFL groups to be configured on one or more component carriers (CCs). Additionally or alternatively, the one or more PFL groups may include one or more PFLs used for aggregation of positioning reference signal (PRS) resources. In some embodiments, the configuration may support one PFL to configure one or more PRS resource sets on one or more component carriers (CCs).

According to further embodiments, the indication may indicate that the PRS resources of the one or more PRS resource sets are linked together according to one or more parameters to identify the PRS resources that are linked together, one or more parameters indicating all PRS resources are linked together, or the PRS resources may be linked together automatically. In some embodiments, the configuration may support mixed single carrier and multi-carrier positioning reference signal (PRS) aggregation. Additionally or alternatively, the configuration supporting mixed single carrier and multi-carrier PRS aggregation may be indicated by one or more separate numerology configurations received from the network node or implicitly through one or more parameters in the configuration received from the network node.

In some embodiments, a user equipment (UE) may include at least one antenna and at least one radio in communication with the at least one antenna and configured to communicate according to at least one radio access technology (RAT). The UE may further include one or more processors in communication with the at least one radio and configured to cause the UE to report, to a network node, one or more UE capability parameters associated with a processing procedure. The UE may receive, from the network node and based on the one or more UE capability parameters, configuration information for the processing procedure. Additionally or alternatively, the configuration information may support downlink (DL) positioning reference signal (PRS) processing and the UE may perform, based on the configuration information, the processing procedure.

According to further embodiments, the one or more UE capability parameters may include one or more combinations of (N, T) values per one or more bands. N may be characterized as a duration of DL PRS symbols in milliseconds (ms) processed every T ms for a maximum bandwidth. Additionally or alternatively, the one or more bands may include up to three component carriers (CCs). In some embodiments, the one or more combinations of (N,T) values may be reported by the UE independently for the one to three CCs or for a maximum aggregated bandwidth.

According to some embodiments, the one or more UE capability parameters may include a parameter indicating a number of DL PRS resources that the UE is capable of processing in a slot over an aggregated bandwidth. Additionally or alternatively, the parameter may be reported per subcarrier spacing (SCS) and per band. In some embodiments, if the configuration information supports a number of DL PRS resources greater than the number of DL PRS resources that the UE is capable of processing, the at least one processor may be further configured to cause the UE to determine that the number of DL PRS resources are arranged in decreasing order of measurement priority. Additionally or alternatively, the configuration information may associate a group of positioning frequency layers (PFLs) with one or more configuration parameters.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
reporting, to a network node, an indication of one or more user equipment (UE) capability parameters associated with a processing procedure for positioning reference signal (PRS) bandwidth aggregation;
receiving, from the network node and associated with the reported one or more UE capability parameters, a configuration for the processing procedure, wherein the configuration supports multiple positioning frequency layer (multi-PFL) processing for aggregation of PRS resources across a plurality of PFLs, wherein the configuration supports one or more PFL groups comprising the plurality of PFLs to be configured on one or more component carriers (CCs), and wherein respective PRS resources in respective PFL groups share one or more common parameters including a first parameter associated with a subcarrier spacing (SCS) and a second parameter associated with a cyclic prefix; and
performing, based on the received configuration, the processing procedure.

2. The method of claim 1, wherein the configuration configures the UE with one or more downlink-positioning reference signal-positioning frequency layer (DL-PRS-PFL) configurations, wherein the one or more DL-PRS-PFL configurations comprise one or more DL-PRS resource sets, and wherein the one or more DL-PRS resource sets comprise one or more DL-PRS resources.

3. The method of claim 1, wherein the one or more common parameters comprise at least one of:
DL-PRS-SubcarrierSpacing associated with the SCS,
DL-PRS-CyclicPrefix associated with the cyclic prefix, or
DL-PRS-PointA associated with an absolute frequency of a reference resource block.

4. The method of claim 3, wherein the indication indicates support for one of:
a same PRS numerology in one or more contiguous component carriers; or
one or more different PRS numerologies in one or more contiguous component carriers.

5. The method of claim 3, wherein the indication indicates support for UE-based positioning estimations using one of:
one or more contiguous PRS;
one or more non-contiguous PRS; or
one or more overlapping PRS.

6. The method of claim 1, wherein the one or more common parameters comprise at least one of a periodicity parameter, a repetition factor parameter, a resource time gap parameter, or a muting pattern parameter to indicate whether aggregation is to be performed.

7. The method of claim 1, wherein the configuration supports one PFL to configure one or more PRS resource sets on the one or more CCs.

8. The method of claim 7, wherein the indication indicates that the PRS resources of the one or more PRS resource sets are linked together according to one of the following:
one or more parameters to identify the PRS resources that are linked together;
one or more parameters indicating all PRS resources are linked together; or
the PRS resources are linked together automatically.

9. The method of claim 1, wherein the configuration supports mixed single carrier and multi-carrier positioning reference signal (PRS) aggregation.

10. The method of claim 9, wherein the configuration supporting mixed single carrier and multi-carrier PRS aggregation is indicated explicitly by one or more separate numerology configurations received from the network node or implicitly through one or more parameters in the configuration received from the network node.

11. An apparatus, comprising:
at least one processor configured to cause a user equipment (UE) to:
report, to a network node, an indication of one or more user equipment (UE) capability parameters associated with a processing procedure for positioning reference signal (PRS) bandwidth aggregation;
receive, from the network node and associated with the reported one or more UE capability parameters, a configuration for the processing procedure, wherein the configuration supports multiple positioning frequency layer (multi-PFL) processing for aggregation of PRS resources across a plurality of PFLs, wherein the configuration supports one or more PFL groups to be configured on one or more component carriers (CCs), wherein the one or more PFL groups comprise the plurality of PFLs used for aggregation of the PRS resources, and wherein respective PRS resources in respective PFL groups share one or more common parameters including a first parameter associated with a subcarrier spacing (SCS) and a second parameter associated with a cyclic prefix; and
perform, based on the received configuration, the processing procedure.

12. The apparatus of claim 11, wherein the one or more UE capability parameters comprise one or more combinations of (N, T) values per one or more bands, wherein N is a duration of DL PRS symbols in milliseconds (ms) processed every T ms for a maximum bandwidth.

13. The apparatus of claim 12, wherein the one or more bands comprise one to three component carriers (CCs).

14. The apparatus of claim 13, wherein the one or more combinations of (N,T) values are reported by the UE independently for the one to three CCs.

15. The apparatus of claim 12, wherein the one or more combinations of (N,T) values are reported by the UE for a maximum aggregated bandwidth.

16. The apparatus of claim 11, further comprising:
a radio operably coupled to the at least one processor.

17. A network node, comprising:
one or more antennas;
wireless transceiver circuitry communicatively coupled to the one or more antennas; and
at least one processor operably coupled to the wireless transceiver circuitry and configured to cause the network node to:

receive, from a user equipment (UE), a report comprising an indication of one or more user equipment (UE) capability parameters associated with a processing procedure for positioning reference signal (PRS) bandwidth aggregation;

transmit, to the UE, a configuration for the processing procedure, wherein the configuration is associated with the reported one or more UE capability parameters, wherein the configuration supports multiple positioning frequency layer (multi-PFL) processing for aggregation of PRS resources across a plurality of PFLs, wherein the configuration supports one or more PFL groups to be configured on one or more component carriers (CCs), wherein the one or more PFL groups comprise the plurality of PFLs used for aggregation of the PRS resources, and wherein respective PRS resources in respective PFL groups share one or more common parameters including a first parameter associated with a subcarrier spacing (SCS) and a second parameter associated with a cyclic prefix.

18. The network node of claim 17, wherein the one or more UE capability parameters comprise a parameter indicating a number of DL PRS resources that the UE is capable of processing in a slot over an aggregated bandwidth.

19. The network node of claim 18, wherein the parameter is reported by the UE per (SCS) and per band.

20. The network node of claim 18, wherein if the configuration supports a number of DL PRS resources greater than the number of DL PRS resources that the UE is capable of processing, the number of DL PRS resources are arranged in decreasing order of measurement priority.

* * * * *